April 10, 1951     P. GRABINSKI     2,547,935
TRANSPORTATION MECHANISM
Filed May 12, 1944     5 Sheets-Sheet 1
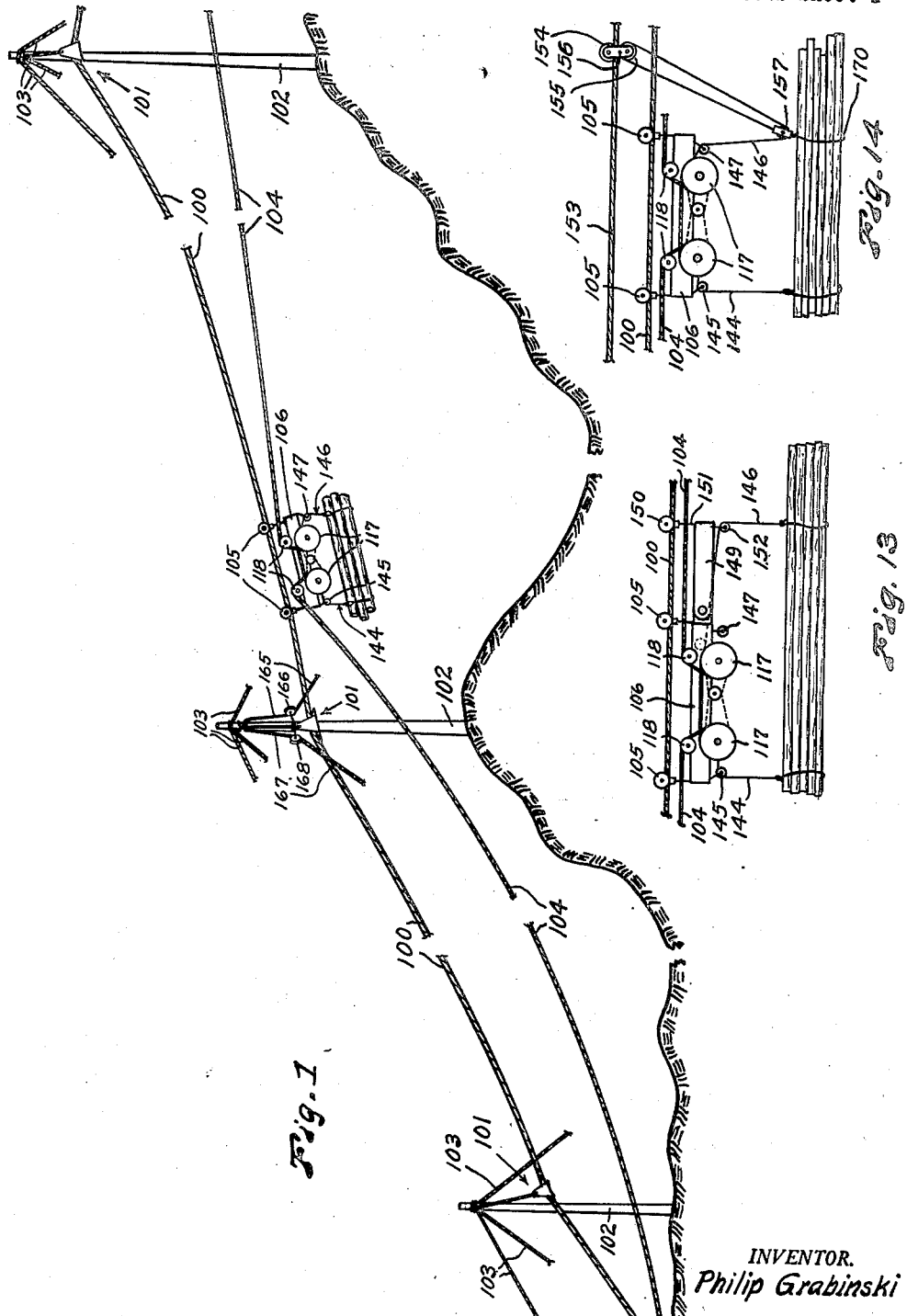
INVENTOR.
Philip Grabinski
BY
Arnold and Mathis
ATTORNEYS

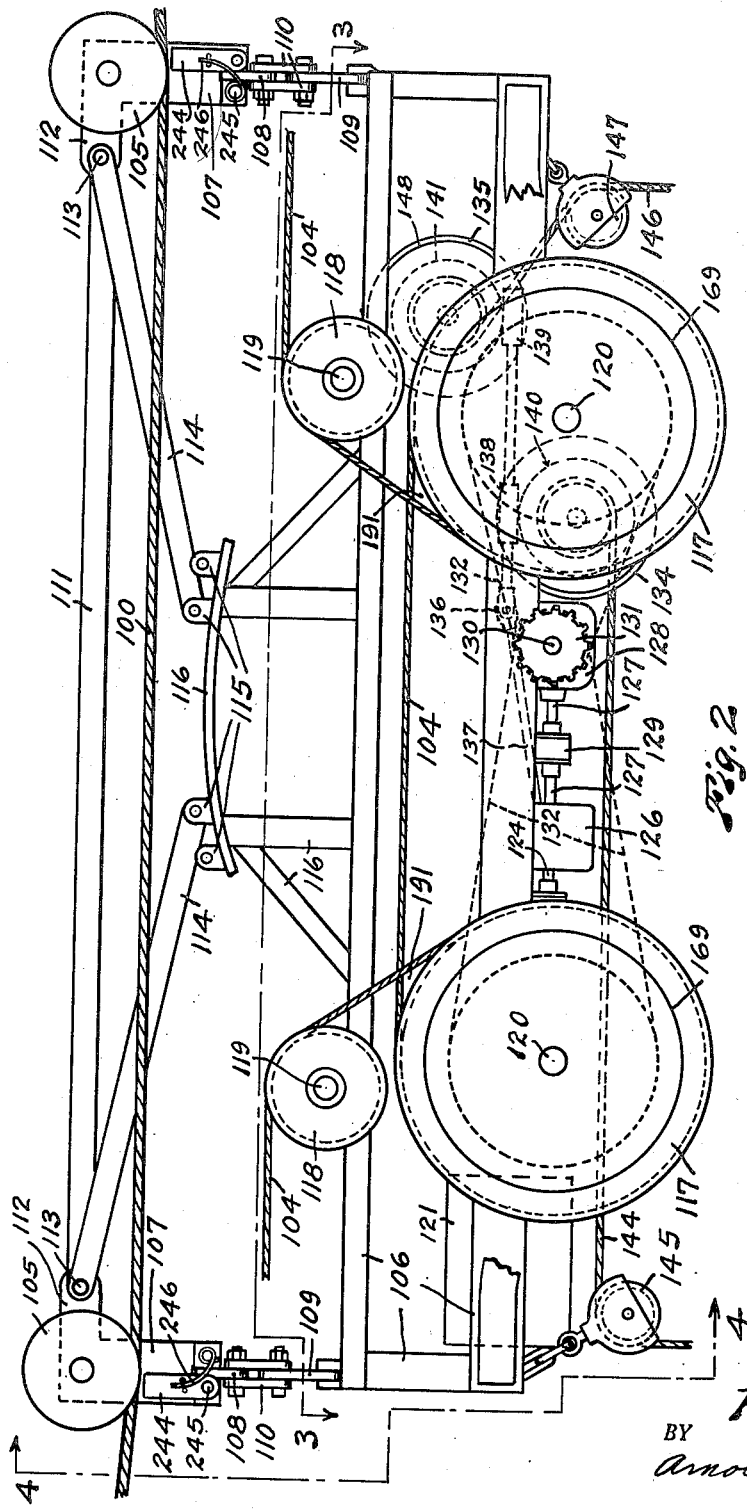

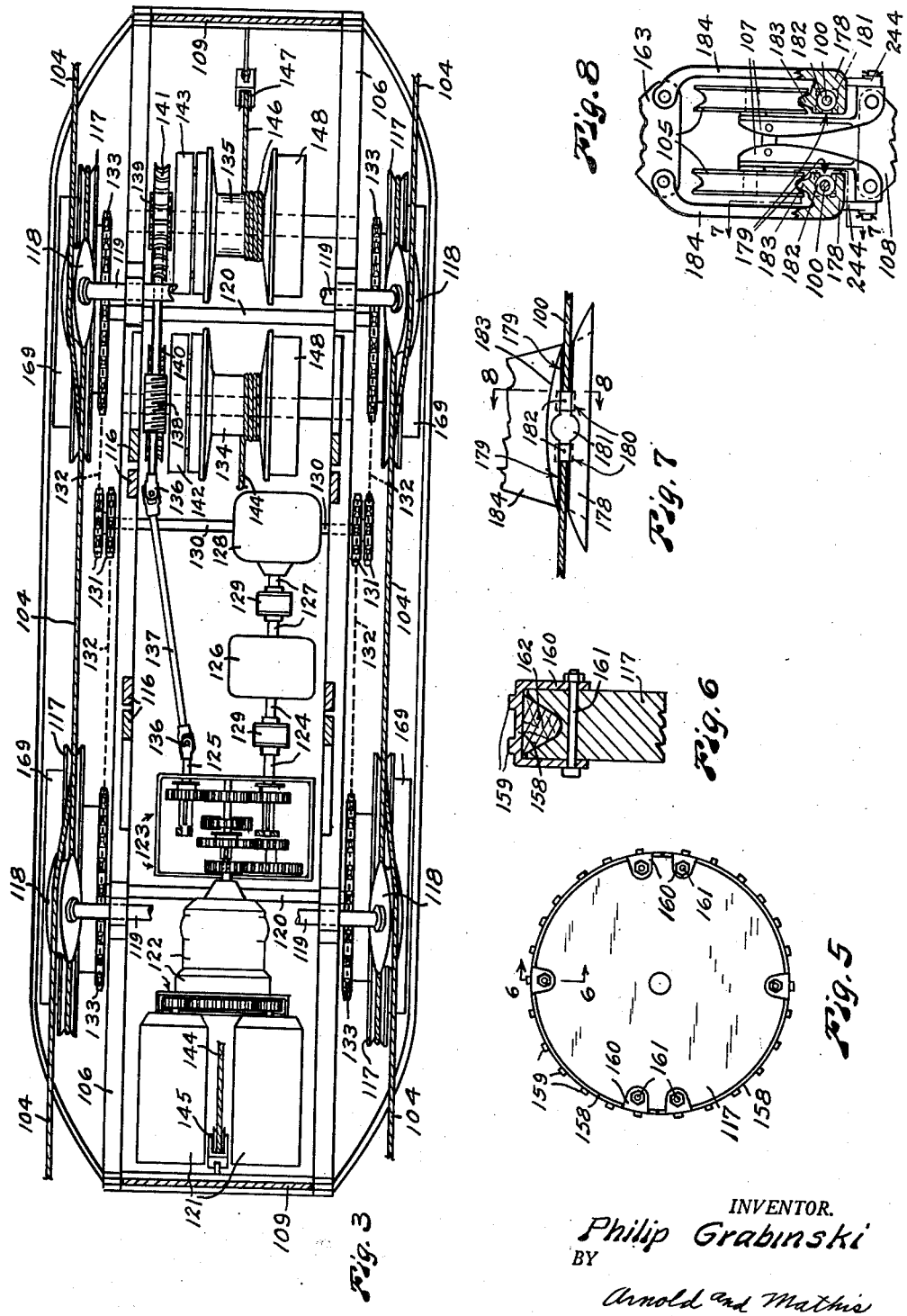

April 10, 1951 P. GRABINSKI 2,547,935
TRANSPORTATION MECHANISM
Filed May 12, 1944 5 Sheets-Sheet 4
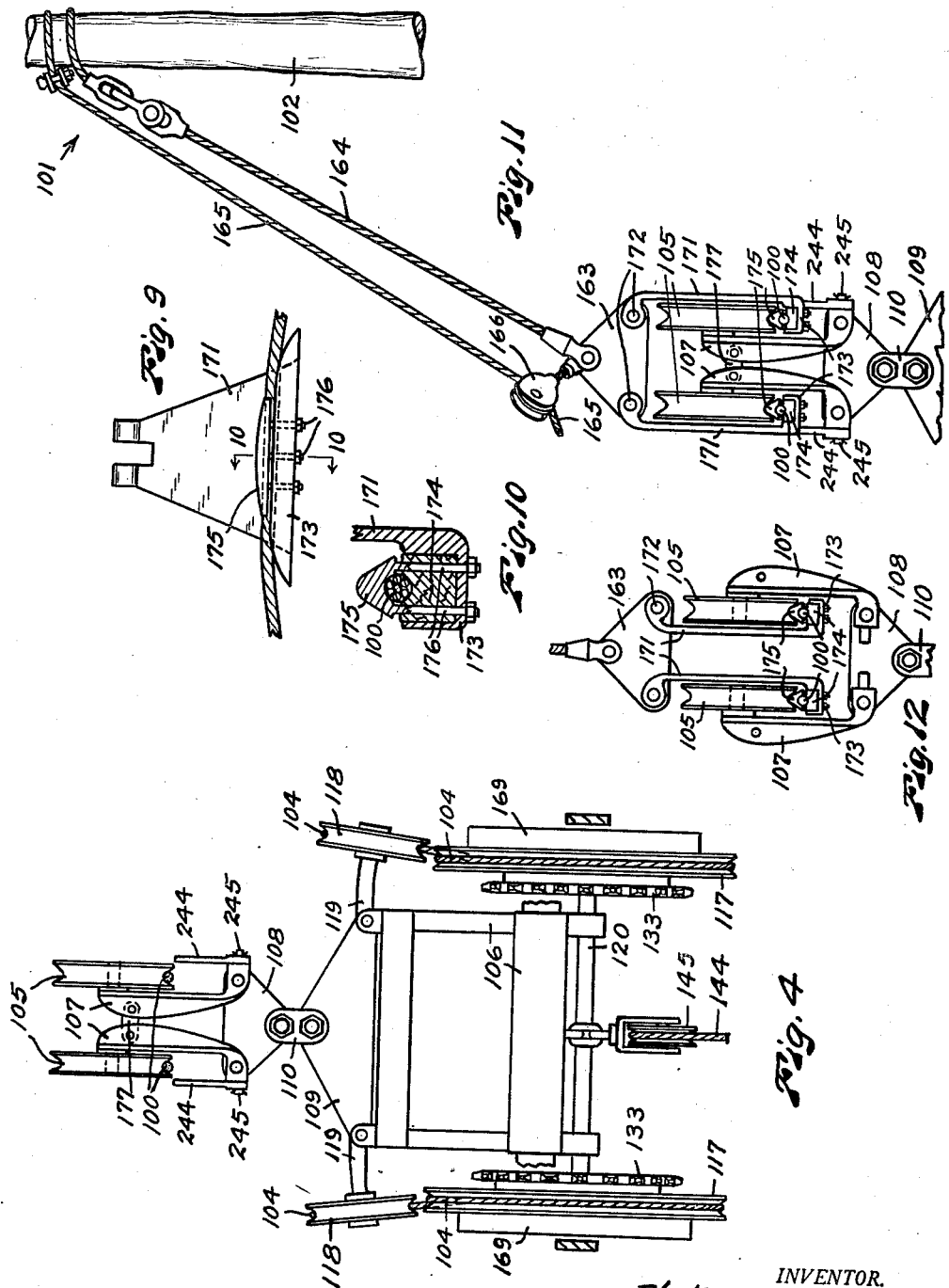
INVENTOR.
Philip Grabinski
BY
Arnold and Mathis
ATTORNEYS

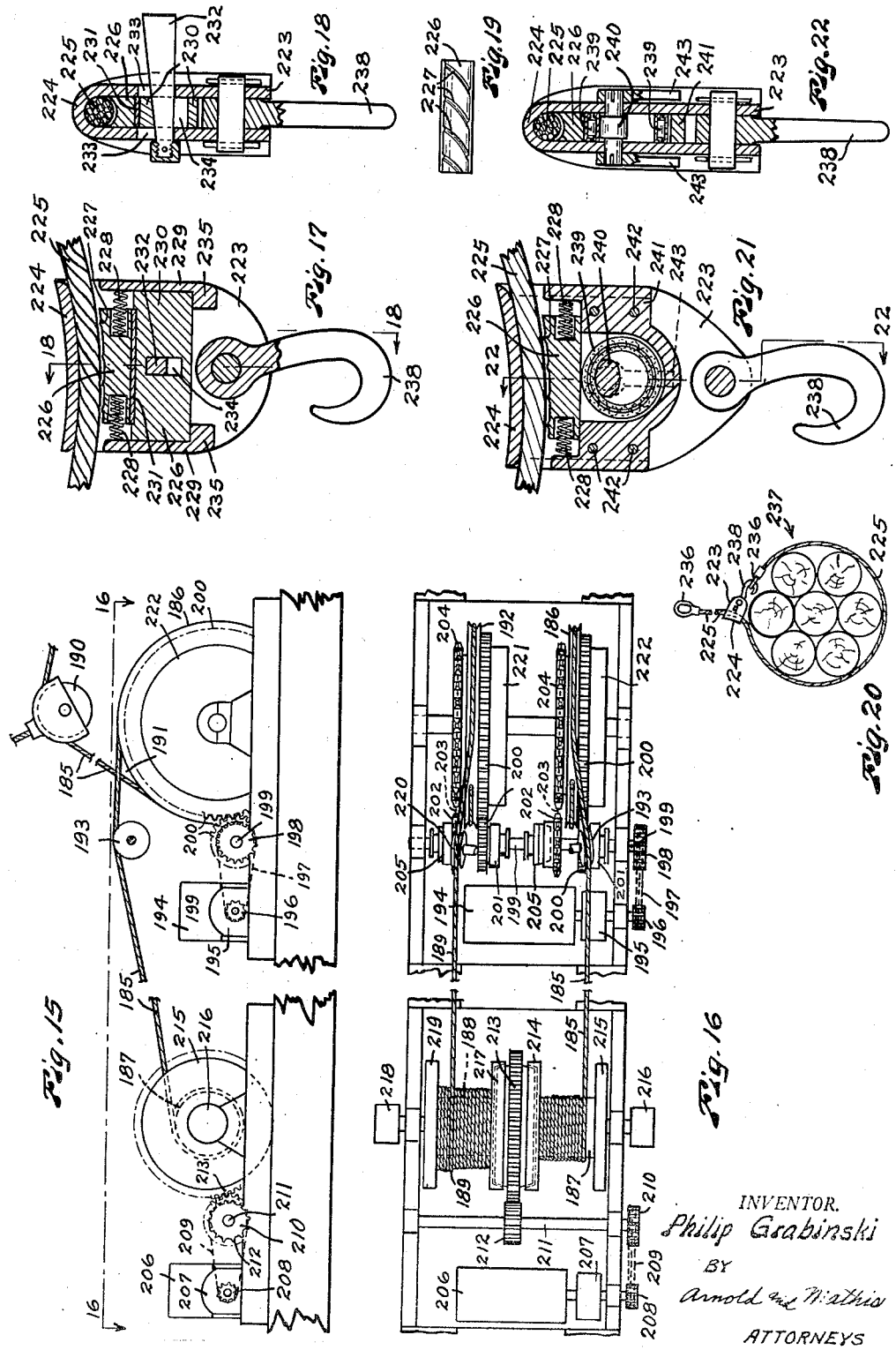

Patented Apr. 10, 1951

2,547,935

UNITED STATES PATENT OFFICE 2,547,935

TRANSPORTATION MECHANISM

Philip Grabinski, Tacoma, Wash., assignor of one-half to Robert W. Pointer, Portland, Oreg.

Application May 12, 1944, Serial No. 535,276

28 Claims. (Cl. 105—155)

My invention relates to a method and apparatus employed therein of transferring or transporting materials of substantial bulk and weight and is a continuation in part of my copending application, Serial No. 405,653, filed August 6, 1941, which has now matured into Patent No. 2,349,263, issued May 23, 1944.

The invention has particular utility in fields such as the military and in logging and as the logging industry is typical, the invention will be described in connection therewith by way of example and not as a limitation.

In logging, often the weight of the load to be transferred may be such as twenty tons and the same often must be transported over heretofore considered impassable terrain.

In the earlier days of logging stands of timber adjacent water beds were available and the distance the logs were to be moved to the water was relatively short. As the stands of such timbers decreased and it was necessary to go farther away from established waterways, roadways, railways and the like, various skidder apparatus and skidding systems were developed so that by use of moving cableways large stands of timber could be successfully logged and the logs moved to established roadways as railroads and the like.

In more recent years the large stands of timber have been so depleted that it is generally considered that skidding systems are in the process of being eliminated as a system of logging. Gradually tractors, commonly called "cats" are being employed to drag the logs to temporary branch roads and then the logs are loaded on trucks and trailers and moved to more permanent roadways, railroads, waterways, and the like. However, in "cat" and truck and trailer logging operations the cost of the branch roads and part of the cost of the more permanent roads, including banks, fills, cuts, and etc., must be paid for out of the logs of a particular stand as the roads, in the terminology of the trade, "cannot be taken with you." With the present policy of selective logging, the amount of pay timber in a particular stand is diminishing and the care required so increases costs that many stands cannot now be economically and commercially logged either by the old skidding systems or by the modern "cat" and logging truck methods. These many stands constitute some of our most valuable timber stands today and the industry has long recognized a need for a method and apparatus (1) where the stands could be economically and commercially logged and (2) where the stands could be logged in a manner consistent with or better than the present requirements for selective logging for preserving the trees remaining.

A short-coming of the prior art skidding systems included the use of moving cables. Such moving cables were a fire hazard and there was excessive wear on the cables. Also, a great portion of the power was expended in moving the cables and not in moving the pay load. It was generally considered that at distances, such as two thousand feet, that so much of the energy was expended in moving the cables and so little was expended in moving the pay load that such distance was the maximum practical distance for a skidding system to operate. As distinguished from such prior art in my invention I have no moving cables, and thus I eliminate the fire hazard and the wear on the cables, and also substantially all of the energy is expended in moving the pay load.

Also, in the prior art system of skidding the counter pressure to hold the machine in place was brought about by the weight of the machine and thus exceptionally heavy mechanism was involved and such machines required good road conditions so they could be moved. As distinguished therefrom I employ fixed cables and obtain traction with such cables so that minimum weights of apparatus are possible and maximum pay loads.

Another objection to the prior art methods of logging is that in railroad logging grades of about five per cent were considered maximum and in motor truck logging grades of approximately eighteen percent were considered maximum. In my invention grades up to fifty per cent are highly practical.

In prior art logging by skidding the operators were far removed from the traveling logs and the system required safety factors to take care of logs which were "hung up" behind stumps, logs, and other obstructions, all of which resulted in extremely heavy cables, extreme wear on the cables, and with a minimum portion of the cables being utilized in moving the pay load. As distinguished therefrom an operator rides on my aerial vehicle and is directly above the load and can periodically adjust the vertical position of the logs as ground terrain conditions require and thus prevent engagement of the log with obstructions tending to cause damage. The damage which was present in the prior skidding systems was damage to the system and damage to the logs. The damage to the logs is well evidenced by the fact that skidding systems cause considerable damage to products, such as Noble fir and Western red cedar, and as to such typical logs the skidding systems were considered inadequate to successfully log the same.

In my invention I provide a vehicle having a self-contained power plant and a vehicle which may be driven over established roadways, whether they be paved, unpaved, or slightly developed roadways and a vehicle which may be also suspended from overhead cables and obtain its traction from fixed cables so that it may be driven as an aerial vehicle where terrain conditions require or make the same desirable.

For example, under present "cat" and logging truck operations many of the same can only operate for a short season of the year as the terrain gives way by constant use of the "cats" over the same terrain. It is therefore an object of my invention to provide a method of logging wherein logging operations may be continued throughout the year. Putting the matter another way my invention provides mechanism which will stand all conditions that the men can stand and the men rather than the equipment will determine weather conditions under which logging may continue with my invention.

It is another object of the invention to provide a vehicle with a self-contained power plant which drives a sheave system which may be employed for providing driving traction means in connection with long anchored cable means with the vehicle either suspended from overhead cables or moving on the ground.

It is a further object of my invention to provide a system of driving sheaves in combination with cable means where utmost traction obtains for movement of the cable means or movement of the driving sheaves.

It is a further object of my invention to provide a vehicle driven by a self-contained power plant, movable by traction engagement with a cable, and having suitable supporting means, as rubber tired wheels, tractor beds, skis, skids, or overhead cable ways.

It is a further object of my invention to provide two driven shafts on each side of a vehicle which are adapted to carry wheels or tractor beds and thereby support and provide movability to the vehicle on the ground and which driven shafts are linked with sheave means so that the same driven shafts through said sheave means may function as cable engaging means—thus the same vehicle may be a self-propelled ground vehicle or a self-propelled aerial vehicle supported on cables and having a traction connection with other cables.

It is a further object of my invention to provide a plurality of driven sheaves positioned to cooperate with cable means to provide relative movement therebetween and convertible to function as driven road engaging wheels.

It is a further object of my invention to provide a traction system wherein cable means are moved or the cable means are stationary and the sheave means moved and with a minimum wear of the cables and a maximum traction. It is a further object of the invention to eliminate all reverse bends in cables reeved about a driving sheave and to provide bends of a character which will not damage or injure the cables and which will eliminate contact between portions of a cable or between cables.

Another object of the invention is to provide two spaced driven sheaves and two spaced guide sheaves disposed thereabove and so disposed that a cable may be reeved over a guide sheave, then guided angularly toward and over and about a driven sheave for less than one complete wrap, then toward and over and about a second driven sheave for less than a complete wrap, and thence angularly toward and over a guide sheave. Another object is to provide said guide sheaves in angular relation relative the driven sheaves so that the laps of the cable will pass each other in non-contacting relation.

Another object of the invention is to provide a method of aerial transportation of heavy and bulky articles, as logs, over difficult terrain conditions where other means of transportation have failed. Another object of the invention is to provide an aerial cableway system of multiple spans and intermediate supports of a nature which do not interfere with the free travel of a suspended vehicle and yet at the same time suspend the supporting cable.

Another object of the invention is to provide a cableway formed of a plurality of cables which is not weakened at the connections between cables and at the same time provides for uniformity in the cableway so that a suspended vehicle may be carried thereon.

Another object of the invention is to provide an aerial cableway means wherein the supporting cable is stationary, the traction cable is stationary and driven sheave means are carried by the supported vehicle and are reeved in such a way about the traction cable as not to in any way injure the traction cable.

Another object of my invention is to provide a vehicle which may be employed to move or remove the cables from the job and thus eliminte much auxiliary equipment. A further object of my invention is to provide an aerial vehicle which may be fixed at desired locations on an overhead aerial support and used to pick up the logs at desired locations within a substantial range of aerial cableway.

Another object of my invention is to provide a device which may be used as a yarder at "spot" locations where desired for the entire length of the aerial cableway.

Another object of my invention is to provide means so that a plurality of logs may be successfully handled as a unit at the time they are removed from the woods and may be delivered as such a unit to a permanent transportation means, as railroads, trucks, or the like.

Another object of my invention is to provide a self-propelled vehicle to tractionally engage stationary cables and which is supported from an aerial cableway and which has separately operable hoisting means carried by the vehicle so that the operator can periodically adjust the vertical position of the logs as ground conditions require.

Another object of my invention is to provide a supporting cableway comprising a plurality of cables all or part of which may be used to support my vehicle and all of which may be used to support the load.

Another object of my invention is to provide an aerial cableway of indefinite length having intermediate supports which are passable by my vehicle.

Another object of my invention is to provide a stationary cableway comprising a plurality of cables, sheave means supported on said cableway and yoke means interconnecting the sheave means to support my vehicle therefrom.

Another object of my invention is to provide sheave means of a nature that will pass intermediate supports on a cableway and which at the same time remove any possibility of the sheaves from leaving the cableway.

Another object of my invention is to provide a vehicle which is mobile and may be employed either as a ground vehicle or an aerial vehicle suspended from supporting cables.

Another object of my invention is to provide a vehicle having a plurality of driven sheaves which may be employed to engage a cable or which may be converted to operate as the traction wheels of a ground vehicle.

The above mentioned general objects of this invention together with others inherent in the same, are attained by the mechanism illustrated in the following drawings, the same being a preferred exemplary form of embodiment of my invention, throughout which drawings like reference numerals indicate like parts:

Figure 1 is a diagrammatic view with portions broken away of structure embodying my invention;

Fig. 2 is a side elevation, on a larger scale than Fig. 1, and with parts broken away of the vehicle shown in Fig. 1 and constructed in accordance with my invention;

Fig. 3 is a plan view, with parts in section and parts broken away, taken substantially on broken line 3—3 of Fig. 2;

Fig. 4 is an end view with parts broken away and taken substantially on broken line 4—4 of Fig. 2;

Fig. 5 is a view in elevation of a wheel-sheave which may be employed in my invention;

Fig. 6 is a fragmentary sectional view taken substantially on broken line 6—6 of Fig. 5 and on a larger scale than Fig. 5;

Fig. 7 is a fragmentary detached view with portions broken away of a cable connector employed in my invention and taken substantially on broken line 7—7 of Fig. 8;

Fig. 8 is a fragmentary sectional view taken substantially on broken line 8—8 of Fig. 7;

Fig. 9 is a fragmentary view in side elevation of an intermediate cable support employed in my invention;

Fig. 10 is a fragmentary sectional view taken substantially on broken line 10—10 of Fig. 9 and on a larger scale than Fig. 9;

Fig. 11 is a fragmentary and somewhat diagrammatic view and with portions broken away of an intermediate support employed in my invention and in said view, there is also shown the supporting sheaves of the vehicle, a fragment of the connecting means to the vehicle, and with the sheaves in a position passing over the structure shown in Figs. 9 and 10;

Fig. 12 is a view similar to Fig. 11 and with parts omitted of a modified form of intermediate supporting means which may be used in place of the structure of Fig. 11;

Fig. 13 is a somewhat diagrammatic view on a small scale of a modified form of vehicle of my invention;

Fig. 14 is a view similar to Fig. 13 of a still further modified form of vehicle of my invention;

Fig. 15 is a somewhat diagrammatic view in side elevation and with parts broken away illustrating the use of my invention with a take-up cable drum means;

Fig. 16 is a plan view looking in the direction of broken line 16—16 of Fig. 15 and with parts broken away of the structure shown in Fig 15;

Fig. 17 is a sectional view with parts in elevation of a combined cable clamp and hook illustrating a means utilizing my method of handling logs in bundles;

Fig. 18 is a sectional view with parts in elevation of the structure shown in Fig. 17 and taken substantially on broken line 18—18 of Fig. 17;

Fig. 19 is a detached plan view of a cable clamping wedge or jaw member showing the cable engaging face of the same;

Fig. 20 is a view showing the structure of Figs. 17, 18, and 19 applied to a bundle of logs;

Fig. 21 is a sectional view similar to Fig. 17 showing a modified cable clamp and hook device; and Fig. 22 is a view similar to Fig. 18 of the structure shown in Fig. 21 and taken substantially on broken line 22—22 of Fig. 21.

Referring more particularly to Fig. 1 of the drawings, 100 represents a supporting cableway which preferably comprises a plurality of cables, as 2, which are shown in Fig. 4. The cables of cableway 100 may comprise single lengths or may comprise cables which have their ends spliced together by means such as illustrated in Figs. 7 and 8 of the drawings. Also, the cableway 100 may be provided with a plurality of supports intermediate its length which are numbered generally 101 in Fig. 1 and shown more in detail in Figs. 9, 10 and 11. The details of the supporting means 101 will be described in connection with Figs. 9, 10 and 11 and for purposes in connection with Fig. 1 the cableway 100 is supported by means 101 from gin poles or spar trees 102—these poles 102 may be the strategically located spar trees found in the woods or they may be erected supports. To support said poles 102, a plurality of supporting guy wires 103 are provided for each thereof. Below the cableway 100 are provided two fixed traction cables 104 which are laterally spaced apart to be reeved about sheaves 117 and 118 as hereinafter described.

The vehicle shown somewhat diagrammatically in Fig. 1 of the drawings is shown on a larger scale in Figs. 2, 3, and 4. This vehicle comprises spaced supporting sheaves 105 which are mounted for traveling movement on the cableway 100. In the event that the cableway 100 comprises two cables, then preferably there will be two sets of sheaves 105, with one set on each end of the vehicle. Such sheaves will travel on cables 100 and support and suspend the vehicle for traveling movement on a cableway 100. Sheaves 105 are connected to the main frame 106 of the vehicle by yoke means, which comprises hangers 107 connected to a plate 108 which is pivotally connected to another plate 109 by links 110. Preferably the link means 110 are disposed between the plates 108 and 109 for adjustment purposes which will be hereinafter discussed. Preferably, supporting members 111 are employed to maintain proper spaced relation between two sheaves 105 operating on the same cable 100. The hangers 107 have brackets 112 and a supporting member 111, between two sheaves 105, may be connected to such brackets 112 by pivot means 113.

Inclined truss braces 114 are also preferably provided and the same, where two cables 100 are employed, will be provided in sets for each side of the vehicle and each of said truss members 114 may be pivotally supported at one end to said pivot means 113 and at the other end to pivot means 115 carried by a support 116 which extends upwardly and substantially centrally from the main vehicle frame 106. Preferably a plurality of pivotal supports 115 are provided in longitudinally spaced relation so that the device may be operated at an angle when desired. For example, when the vehicle is operating on a cableway 100 having a substantial incline and it is desired to provide an incline to the vehicle so that an internal combustion engine or motor carried thereby will be operating at not greater than a predetermined angle, the two truss bars 114 toward one end portion of the vehicle may be connected to further longitudinally spaced pivot means 115 and the link 110 at the said end of the vehicle may be replaced by a longer link. Thus one end of the vehicle may be placed at a lower level than the other end relative to the cableway 100 and thus provide for the desired angular relation of a motor when the vehicle is continuously operating on a steep angularly positioned cableway 100 for more satisfactory operation of the motor employed. Many motors will operate at various angles without interfering with the oiling system and others have a more limited longitudinal angular range of operation. Thus the links 110 and the adjustment of the truss bars 114 will permit motors of wide angular range of operation to be employed.

Two driven traction sheaves 117, on each side of the vehicle and in longitudinally spaced relation, are preferably employed in this invention. Preferably the diameter of the traction sheave 117 is substantially thirty times, or greater, than the diameter of the cable employed and thus a cable, reeved about such a sheave 117 of such size, will not be subjected to bending which will cause damage to the cable. It has been found that where a cable operates over bends which are substantially thirty times, or greater, than the diameter of the cable that the strands of the cable can move sufficiently to take care of their different lengths of travel without damage. Guide sheaves 118 are positioned one above each of the driven traction sheaves 117 and said guide sheaves 118 are angularly positioned relative to the driven sheaves 117 as is best shown in Figs. 3 and 4 of the drawings. Referring more particularly to Figs. 2 and 4, the guide sheave 118 and the driven sheave 117, which are to the right of said Fig. 2 with one above the other, are arranged so that the guide sheave 118 is inclined from the vertical plane of the sheave 117 and the groove of the sheave 118 points directly at the groove of the sheave 117. Describing the parts in another way, the medial plane of the groove of each sheave 118 intersects the medial plane of the groove of its associated sheave 117 at the place where the cable is delivered to or from such sheave 117. Thus a traction cable 104 may pass over the sheave 118 and is guided thereby and then leads directly from the groove of the sheave 118 to the groove of the sheave 117. The portion of a sheave 118 and the portion of the sheave 117 that are pointed directly in line are the portions where the cable 104 left or entered the sheave 118 and the portion where the cable 104 first contacted or left, respectively, the sheave 117.

Thereafter the traction cable 104, entering the groove of the sheave 117, passes around the groove of the sheave 117 for almost a complete turn (see air space designated as 191 of Fig. 2 of the drawings) and the cable 104 thence passes directly to and around the driven traction sheave 117 at the left of Fig. 2 of the drawings for almost a complete wrap (see again the air space 191) and thence the cable passes over the guide sheave 118 to the left of the showing in Fig. 2 of the drawings. The arrangement of the guide sheave 118 and the driven sheave 117 therebelow to the left of Fig. 2 of the drawings is similar to that of those described to the right of said figure. The sheaves 117 are in line and disposed in vertical planes and thus said sheaves 117 may be employed in connection with traction means on the ground as hereinafter described. However, by reason of the angular position of each guide sheave 118, the cable may be delivered to or taken from a driven sheave 117 and at the same time the portion of the cable 104 between driven sheaves 117 will be in spaced relation so there will be no rubbing of the cable or contact between portions. The amount of angular positioning of the sheaves 118 to the vertical need be only sufficient to povide some laterally spacing between portions of the cable 104 as the same enter and leave a driven sheave 117.

In Fig. 2 of the drawings each guide sheave 118 and its matching driven sheave 117, as those to the right of Fig. 2 of the drawings, are shown in a position so that less than a complete wrap of the cable 104 around a driven sheave 117 obtains. As said guide sheave 118 (to the right of Fig. 2) is longitudinally adjusted to the right the more complete will be the wrap of the cable 104 about the driven sheave 117. On the other hand as said guide sheave 118 is longitudinally adjusted to the left, the less portion of a wrap around driven sheave 117 obtains. It is desirable to obtain as complete a portion of a wrap as possible for traction purposes and at the same time if more than a complete wrap is obtained then the two portions of the cable entering and leaving the groove of the sheave 117 will rub against themselves and against the flanges forming the groove and the life of the cable seriously impaired. Thus it is desirable to obtain almost a complete wrap and permit the cable portions to pass in air but yet not to obtain a complete wrap of the cable 104 about a driven sheave 117.

As described in my copending application, now Patent No. 2,349,263, one of the driven sheaves 117 will operate as a traction sheave and the other thereof will operate as a slack pulling sheave depending upon the direction of travel of the vehicle.

Referring to Fig. 1 of the drawings, each cable 104 is secured only at its ends and thus we will have a taut portion because of traction and a relatively loose-hanging suspended portion. Thus the portion 104, which is downhill from the vehicle or behind if the suspension is over level ground, will hang suspended and the weight of such cable 104 will be effective to tighten the cable around a driving sheave 117. Thus I employ the weight of the cable 104 to augment the traction between said cable 104 and a driven slack pulling sheave 117. Also I employ one of said driven traction sheaves 117 as a slack pulling sheave and the other of said driven traction sheaves 117 as the driving traction sheave for the vehicle. In the foregoing, discussion has been made regarding sheaves on one side of the vehicle and obviously the same action occurs on the sheaves 117 on both sides of the vehicle. Furthermore, by locating sheaves 117—118 substantially at the four corners of the vehicle I provide for stability of the vehicle which is suspended from the overhead cableway means 100. It has been found that the stability provided by having the sheaves 117—118 so located and engaging traction cables 104 as well as the vehicle being suspended from the cable means 100, provides for great stability and the vehicle does not sway unduly and is comfortable for the operator riding thereon.

The arrangement of the sheaves 118 and 117 in relation to each stationary traction cable 104 provides for minimum wear on both the sheaves and the cable. A cable is directed from one sheave to the other and there is no relative movement of the cable as respects a contacted portion of a sheave and thus wear is eliminated. Note that as shown in Fig. 4 of the drawings, the groove of each of the said sheaves 117—118 correctly interfits with the cable 104. Thus there is no sidewise rubbing or relative movement between a cable 104 and the groove of any of the sheaves 117—118 and as distinguished therefrom the cable is fed into a groove, follows the groove and is directed by the groove in a sheave 118 directly to the groove of a sheave 117. The guide sheaves 118 are rotatably mounted on any suitable bearing and supporting means 119 and the driven sheaves 117 are mounted on any suitable supporting and bearing means 120 (see Fig. 4).

Referring to Fig. 3 of the drawings a source of power is indicated as two motors 121 which are interconnected by suitable means as a gear reduction, clutch and torque converter means 122. The output of the torque converter means 122 is delivered to a gear changing device which is generally indicated as 123. This gear changing device 123 provides for the delivery of rotary power to the shafts 124 and 125. Preferably I provide an arrangement of gears in means 123 so that the shaft 124 may be driven in either direction and at the same time the shaft 125 may be driven in either direction. Also, either shaft 124 or 125 may be at rest while the other is being driven in either direction. Also I provide for multiple gear ratios so that the speed of rotation of the shafts 124 and 125 and the mechanical advantage gained may be varied. In view of the fact that mechanisms accomplishing the said purposes of 122—123 are not a part of the invention, herein claimed parts have been shown somewhat diagrammatically and are not described in detail.

I preferably employ a hydraulic speed controlling device which will control the speed of my vehicle and which will provide all braking necessary except for full stops. A device which is very suitable for my purpose is a device which is commonly known on the market as a "Hydrotarder." With such a device, a valve mechanism may be set so that the speed of the vehicle may be limited to variable and adjustable set speeds. For example, it may be desirable to limit the speed of the vehicle and a load of logs going downhill to a speed such as 25 miles an hour and this may be done with the device 126 and at the same time there will be no wear on operating brake bands and the like. Also adjustments will provide other speeds desired approaching a full stop. Brake drums 169 having suitable selectively operable brake bands (not shown) are employed to completely stop the vehicle or hold the same at any desired location relative to the cables 104 and in turn cables 100.

The output of rotary power from the device 126 is delivery to shaft 127 and thence to differential means 128 of usual construction. Preferably universal or flexible couplings 129 are employed in the shafts 124 and 127. Each of the two output shafts 130 from the differential 128 carries two sprocket wheels 131 and each of said sprocket wheels 131 is connected by link belt means 132 (shown diagrammatically by dotted lines in Figs. 2 and 3) with a sprocket wheel 133.

Each sprocket 133 is carried by a driven sheave 117. The advantage of employing sprockets 131 and 133 and link belts 132 is that the gear ratio of the device may be readily changed when desired without structural modifications of the device. Also, in view of the fact that two driven sheaves 117 on the same side of the vehicle are interlinked so they are driven together permits the vehicle to rest when on the ground on said sheaves 117 or on road supporting means as wheels or tractor beds or a conversion of the sheaves 117 and thus if two wheels on the same side of the vehicle are held then through the differential 128 the two wheels on the other side may be driven in either direction and thus we have what is generally termed tractor steering of the vehicle.

The embodiment of my invention shown in Figs. 1 to 4 inclusive has an advantage in that the driven sheaves 117 are lowermost and vertically aligned. This means that I can secure any suitable traction means to said sheaves 117 and the vehicle is well adapted for ground travel. Rather than securing rubber tired wheels, tractor means, or the like, as shown in my Patent No. 2,349,263 and to provide minimum weight, the sheaves 117 may be well adapted to function as road engaging means by the structure shown best in Figs. 5 and 6 of the drawings. The road contacting surface portions 158 are arcuate shape and a plurality, such as two, may be employed. These road contractors 158 are preferably provided with mud cleats 159 and have suitable means to secure the members 158 to a sheave 117. This means may include a plurality of side flanges 160 adapted to engage the sides of a sheave 117 and bolt means 161 extend through the side flanges 160 and through the sheave 117. In order to equalize the road pressure over the whole surface of the groove of the sheave 117 I preferably employ a filler means 162 disposed between the road contactors 158 and the groove of the sheave 117. This filler member 162 may be carried by road contactors 158 or the same may be loose and disposed between the road contactors 158 and the groove of the sheave 117. A suitable material which may be employed in the fillers 162 is hard wood as it will have the desired shock absorbing and wear characteristics.

The shaft 125 is connected by suitable means with one or more hoisting means, as the two hoisting drums 134 and 135. Such means may include universal 136, shaft 137, and worms 138 and 139, which mesh with worm wheels 140 and 141. A suitable means for transmitting the power on the worm wheels 140 and 141 to the drums 134 and 135 respectively is the use of a planetary transmission. In view of the well known nature of such type of transmission in the art, I have only shown the brake drums 142 and 143 which if held will provide for transmission of power between the worm wheels 140 and 141 and drums 134 and 135 respectively and the extent of power transmitted will depend upon the extent of braking applied to the brake drums 142 and 143. The cable 144 on the drum 134 is supported by suitable sheave means 145 and the cable 146 on the drum 135 is supported by suitable sheave means 147. Thus by the use of the gear changing device 123 the shaft 137 may be driven in either direction and upon application of the braking means to one or both of the brake drums 142 and 143, one or both of the hoisting drums 134 and 135 may be driven in the suitable direction to take-up or pay-out cables 144 and 146.

In order to hold the drums 134 and 135 stationary and a load which may be suspended from the cables on said drum, brake means 148 is provided on each of the drums 134 and 135.

In view of the foregoing it is obvious that a log or a plurality of logs may be suspended from both cables 144 and 146 as shown in Fig. 1 of the drawings. Also it is possible to suspend one end of a log or group of logs from either or both of said cables 144 and 146. It is customary practice in the woods today to only carry one end of a log and allow the other end to drag on the ground and thus the transportation means has to support only a weight strain equivalent to about two-thirds of the weight of the log or logs involved. While such method of dragging logs rather than carrying them lessens the weight on the transportation means, yet it often causes damage to the timber being carried and to the underbrush and seedling trees which may be present. Therefore, preferably I suspend the log or logs and carry both ends as indicated in Fig. 1 of the drawings. The utmost in selective logging is possible by the use of my invention in the different manners described. Also the "cats" or other equipment used to bring the logs within range of the cableway 100 or other vehicles, as military vehicles, may be provided with an eye means which can be readily engaged by cables 144 or 146 or both and such equipment thereby transported.

Referring to Fig. 13 of the drawings a modified form of vehicle is shown and the modification particularly resides in the use of an extension member 149 and parts connected therewith. In said Fig. 13, the corresponding parts to the vehicle previously described are given similar numbers, namely, cable 100, traction cable 104, sheaves 105, driven traction sheaves 117, guide sheaves 118, log-supporting cables 144 and 146, and main frame 106. Also sheaves 145 and 147 are shown, but sheave 147 will not be employed in view of sheave 152, the operation of which will be hereinafter described. Pivotally connected to said main frame 106 is extension member 149 which is suspendedly supported at its outer end by sheave means 150 and connecting means 151. At the outer end of said extension means 149, a sheave means 152 is provided and the log supporting cable 146 is reeved over said sheave 152. Thus by the use of the extension means 149, the same vehicle previously described may be employed and I obtain a longer hitch so that longer logs may be carried and readily supported at both ends. Also in the operation of the device shown in Fig. 13 of the drawings, logs may be suspended so that the cable 144 will engage a log or logs near one end and the cable 146 will engage the logs removed from the other end. Thus the cable 144 will transmit less than half of the weight of the logs through the vehicle to the supporting cable 100 while the cable 146 which will carry the greater part of the weight of the logs due to the overhanging portion and will transmit the greater portion of the load directly to the main cable means 100. Thus in the event of logs weighing in excess of the safe load of the vehicle or close thereto, it is possible by the extension means 149 to limit the weight carried by the vehicle and place more of the weight directly on the main cable 100.

Referring to Fig. 14 of the drawings a still further modification is shown and the vehicle employed is the same vehicle previously described and the parts diagrammatically shown are given similar numbers. The additional elements employed in Fig. 14 are the additional stationary supporting cable 153, sheave 154 mounted for traveling movement on said main cable 153, sheave means 155 suspendedly supported from sheave 154 by link means 156, and sheave means 157. The log-supporting cable 146 is reeved through sheave 157, through sheave 155, and thence to sheave means 157, which is connected with the logs. In the drawings in Fig. 14 I have shown a leverage of a block and a half, however it is obvious that any desired leverage may be obtained. The sheave means 157 is preferably connected to the log or logs removed from the end thereof as shown in Fig. 14 of the drawings by choker 170. Thus a portion of the weight of the logs will be transmitted via cable 144 and the vehicle to the cableway 100, a portion of the weight of logs will be transmitted via choker 170 and thence via cable 146 and the vehicle to cable means 100, and a portion, depending upon the overhang of the logs past the end of the vehicle, will be supported by the choker 170 and cable 146 and through the sheaves, as indicated, to the additional supporting cable 153. Thus in Fig. 14 I have shown another way to increase the capacity of the vehicle and this by the use of an additional cableway means 153 which solely carries weight from the logs and does not carry the vehicle.

In order to suspend the cableway 100, I may employ two strategically located spar trees or gin poles and suspend merely one span of cableway 100 between the two as is illustrated in my Patent No. 2,349,263. Preferably I suspend the cableway 100 as indicated in Fig. 1 of the drawings herein and as shown more in detail in Figs. 9 to 12 inc. Referring to Figs. 1 and 11 of the drawings, a plate 163 is suspendedly supported in relation to a spar tree or gin pole 102. This may be accomplished by providing a supporting or hold-up cable 164 having its ends connected respectively to gin pole 102 and said plate 163. Such hold-up cable 164 will take vertical strain. Cables 165 and 167 are employed to hold the cables 100 laterally from the gin pole or spar tree 102 and to sustain longitudinal strain. The upper ends of the cables 165 and 167 are suitably secured to the gin pole 102 and the lower ends of said cables 165 and 167 are anchored to means laterally removed from the gin pole or spar tree 102 and spaced longitudinally in the direction of cableway 100. The cables 165 and 167 are respectively reeved through blocks 166 and 168 which are connected with the plate 163. Thus upon tightening of the cables 165 and 167 and securing the same to objects, which are laterally removed from the spar tree 102 in a direction toward the observer of Fig. 1 and away from spar tree 102 and which are spaced on opposite sides of a spar tree in a direction longitudinally of cableway 100 the plate 163 is moved and suspended laterally as respects said spar tree 102 and is longitudinally fixed as respects cableway 100. Also due to the bight of the blocks 166 and 168 in the cables 165 and 167, the cables 165 and 167 also function to take part of the vertical strain. The longitudinal strain sustaining characteristics of cables 165 and 167 provides a plurality of spans each of which is self-sustaining and so the combined weight of the cableway is not borne by the end supports of such cableway 100.

In order that the device, shown either in Figs. 1 to 4 inc. or Fig. 13 or Fig. 14, may pass an intermediate support 101, structure as that shown in Figs. 9 to 11 inc. or Fig. 12 of the drawings is employed. In such view I have shown two sheaves 105 which are mounted for traveling movement on the cables of the cableway 100. The remainder of the vehicle, which is not shown in said Figs. 9 to 11 inc. or Fig. 12, is not necessary to understand the matter there illustrated. Figs. 9 to 11 inc. and Fig. 12 illustrate a way of supporting a cableway 100 by an intermediate support 101, so that the vehicle may pass such intermediate support 101. The plate 163 is supported in spaced relation to the pole 102. In Figs. 9 to 11 inc., two brackets 171 are pivoted by pivotal means 172 to the plate 163. These brackets 171 have inwardly projecting portions 173 (see Fig. 10) and the portions 173 are spaced apart (see Fig. 11) so that the hangers 107 may pass between the portions 173. Each portion 173 is preferably fabricated to form a U-shaped, in section, support for receiving a block 174. Each of the blocks 174 has a groove in its upper surface of a size to receive therein approximately one-half of one of the cables 100. Above the cable 100 is disposed a member 175 which provides on its upper surface a portion of the cableway 100 and also has a groove in its lower surface which functions in combination with the parts 173—174 as a cable clamp. Bolt means 176 interconnect the portions 175 and 173—174. One way of providing bolt means 176 is to form the same as studs integral with the member 175 and pass threaded portions of the same through openings in members 174 and 173 and place threaded nuts on the threaded end portions of the bolt means 176 so that by threaded engagement between the bolt and the nut it is possible to tighten the two halves of the cable clamp embodying the part 175 and the parts 173 and 174.

In the structure shown in Figs. 9 to 11 of the drawings, the hangers 107 pass between the brackets 171. In the form of the invention shown in Fig. 12 of the drawings the same parts are employed as were employed in Figs. 9 to 11 of the drawings but the parts are so arranged so that the hangers 107 are on the outside and the brackets 171 are on the inside. As shown in Fig. 11 of the drawings, a link means 177 is disposed between hangers 107 and the respective ends of said link means 177 are pivoted to the hangers 107. When the parts are arranged as shown in Fig. 12 of the drawings, then the link means 177 will not be employed.

Pivoted guards 244 are supported by hangers 107, as from pins 245 connected therewith, and are normally held in position to prevent relative sidewise movement of a cable 100 and a hanger 107 by spring means 246. Thus the guards 244 will normally be in the position shown in Fig. 4 but the same will be depressed when passing through an intermediate support as shown in Fig. 11.

Referring to the structure of Fig. 11 which will well illustrate the mode of operation, I pivot the brackets 171 to the plate 163 and such brackets 171 each support a cable 100. Also each of the hangers 107 supports a sheave 105 and the lower ends of the hangers 107 are pivoted to a plate 108. Thus in the event that one of the cables 100 should break or sag or in the event that a bracket 171 or a hanger 107 should break, then because of the pivotal connections involved the plate 109 and the vehicle therebelow would be directly suspended and in line from a sheave 105 from a cable 100 and thus utmost in the way of safety is provided. Preferably in the interest of safety, each cable 100 is sufficient, with a factor of safety, to carry the weight of the vehicle and the weight of the logs which are being carried and thus because of the pivotal connection shown in Figs. 9 to 12 inc. of the drawings provision is made so that should one of the cables break or slip and thus lose its supporting power, the connection between the means to support the cable and the connection between the vehicle and the cable will realign themselves so that we have a direct pull involved and at the same time the vehicle remains level.

Figs. 7 and 8 show a preferred form of cable coupling means that may be used. Said cable coupling means comprises a body member 178 having in one side two aligned longitudinal grooves 179 with their end portions terminating in sockets 180 of larger size than said grooves. The sockets 180 are connected with a transverse recess 181. The respective ends of the cables 100 to be coupled are each provided with an enlarged rigidly attached cable fitting or thimble 182 of conventional form. An arched track member 183 provides an easy curve by way of which a wheel or sheave 105 may pass over the coupling member. The end portions of the cable 100 are connected with the coupling member by inserting a thimble 182 and the end of a cable 100 into transverse recess 181 and groove 179 respectively from the side—the thimbles 182 being inserted one after the other in the socket or recess 181 and then drawn into the socket 180 where they will be held as long as tension is exerted on the cables 100. Body members 178 terminate in hangers 184 and the hangers 184 are secured together.

The purpose of interconnecting hangers 184 is so that the relative position of the two arched track members 183 will be maintained and they cannot individually twist and have the sheaves 105 attempt to run on the bottom side of the device rather than on the arched track members 183. In the event that the length of a cable 100 terminates intermediate poles 102, then the connector will be employed as shown in Figs. 7 and 8 of the drawings. However, should a cable terminate at a location where it is desired to employ a cable supporting means such as shown in Figs. 9 to 12 inc., then the cable connector means of Figs. 7 and 8 can obviously be employed in combination with the structure shown in Figs. 9 to 12 of the drawings and thus we will have a combination cable splice and cable supporting means.

In Figs. 7 and 8 of the drawings, I have shown a structure wherein two cables 100 may be spliced or either of the two may be spliced. Whether either or both cables 100 are to be spliced the same device shown in Figs. 7 and 8 should be employed so that the supporting of the trackways 183 will be borne by both cables 100 and it will be impossible for only one track member 183 to twist or turn and thus not be in a proper position to receive a sheave 105. In the event that only one of the cables 100 has a splice therein and thus only one is provided with thimbles 182 to secure a hanger 184 to such cable 100, then the other hanger 184 will be provided with a cable clamp means, such as that shown in Figs. 9 to 12, so that both cables 100 support the cable splicing structure.

Referring to Figs. 15 and 16 of the drawings, structure is illustrated to utilize my invention wherein guide sheaves and a driven sheave are employed and the traction cable is reeved about the driven sheave for almost a complete wrap.

In said figure, the traction cable 185 is to be moved and the driven traction sheave 186 is held relatively stationary. When a drum such as drum 187 is driven and a cable, as cable 185, is wound on such drum, it requires successive layers of cable to provide the necessary cable. Thus as the cable builds up in layers or is reduced in the number of layers, the diameter of a drum, such as 187, is effectively changed so far as concerns its peripheral travel and the cable being drawn in or paid out. Thus it is common practice to provide friction means between a drum, such as a drum 187, and its driving means. However, as the portions of the cable being paid on or off a drum 187 engage each other, there is a biting or chafing action and it is well recognized that this constitutes one of the greatest wear producing structures that we have in connection with cables being driven onto or off of a drum. By the use of my invention is it possible to employ a driven traction sheave in connection with a drum, onto which cable is being fed off or on, and at the same time with the substantial elimination of all wear on the cable.

In order to illustrate the utility of my invention in connection with a cable and drum, I have shown in Fig. 16 two drums 187 and 188. These may be, for purpose of illustration, the interlocked drums of my Patent No. 2,318,218 issued May 4, 1943. The traction cable 185 is fed to the traction sheave 186 by any means suitably in line with the groove of the traction sheave 186, which is illustrated as a sheave 190. Thereafter the traction cable 185 passes around the traction sheave 186 for almost a complete wrap (see the air space numbered 191 of Fig. 15—the same air space 191 will be present in connection with the traction cable 185 and the traction sheave 186 and also in connection with the traction cable 189 and the traction sheave 192) and the cable 185 will be fed to a guide sheave 193 which is angularly disposed. The guide sheave 193 is angularly disposed similarly to the guide sheaves which were mentioned in connection with Figs. 2 to 4 inclusive of the drawings and the same angular relationship will exist between a guide sheave 193 and a driven sheave 186 that existed between a guide sheave 118 and a driven sheave 117 of the previously mentioned figures. Thus I provide for less than a complete wrap of the cable 185 around a driven traction sheave 186 and thence the cable is guided by angularly positioned guide sheave 193 and directly toward a driven drum 187. Again the size of the sheave 186 is such, that the groove thereof, is at least substantially thirty times greater than the diameter of the cable 185 and thus substantially no wearing strain is provided on the cable 185. Also the guide sheave 193 need only lift the cable 185 upwardly sufficient so that its groove can properly function and thus substantially no bending action is provided in the cable 185 by the guide sheave 193 and again we have substantially no wear on the cable 185.

It is the purpose in Figs. 15 and 16 of the drawings to provide the traction between the cable 185 and its source of driving power driven sheave 186 and to employ the drum 187 merely with sufficient power to function as a take-up device to reel in or pay out cable and with only sufficient power to take-up cable and not drive the load. In order to illustrate means for driving the driven sheave 186, I show a source of power 194, power transmission means as a torque converter 195, sprocket means 196, link belt means 197 (diagrammatically shown by dotted lines), sprocket means 198, and driven shaft 199. The driven shaft 199 is connected with the driven traction sheave 186 to drive the same in one direction by gear means 200 which is selectively operable by clutch means 201. Thus through the action of gear means 200, the driven traction sheave 186 will operate in one direction and as shown in Fig. 16 of the drawings, cable will be wound on drum 187 for a given direction of drive of the source of power 194. Also connected to driven shaft 199 is sprocket 202, link belt 203, and sprocket 204 carried by driven traction sheave 186. Also a clutch means 205 is provided to selectively engage the sprocket wheel 202 with the shaft 199. Due to the fact that a link belt 203 is employed then when the drive is through such link belt and the source of power 194 is driven in the same direction, then the driven traction sheave 186 will operate in the opposite direction and will function to pay out cable 185 passing over the driven sheave 186.

In view of the fact that the driven traction sheave 186 maintains a constant diameter and in view of the fact that such driven traction sheave provides the load carrying power to the cable 185, I am able to provide a minimum wear on the cable 185. The power transmitted to the drum 187 is only sufficient to maintain the cable 185 under tension as it is reeled on the drum 187 and power to move the load on cable 185 is not transmitted through the drum 187 to the cable 185.

A means to drive drum 187 may comprise: source of power 206, power transmitting means as torque converter 207, sprocket 208 connected with the outlet of 207, link belt means 209 (shown diagrammatically by dotted lines) reeved over sprockets 208 and 210, and a driven shaft 211 connected with sprocket 210. The power on shaft 211 is transmitted by gears 212 and 213. A clutch means 214 connects the rotary power on gear 213 with drum 187. A brake means 215 is connected with the drum 187 and will be employed as hereinafter described. A means of operating clutch 214 is illustrated by 216 which is the conventional air jam operating means for clutches employed in the woods. When cable is being wound on drum 187, the power to pull the load will be furnished by driven traction sheave 186. Cable leaving the guide sheave 193 will be directed onto drum 187. The torque converter 207 employed in driving the drum 187 will transmit sufficient power so that drum 187 will function as a take-up drum but not as a power transmitting drum. Also the speed of rotation of the drum 187 is normally higher than the speed of rotation of the driven traction sheave 186 so that all slack will be taken up regardless of whether or not there are a number of layers of cable around drum 187. Therefore as drum 187 always attempts to move faster than driven sheave 186 and the tendency to move faster is increased as the number of layers of cable on drum 187 are increased, there always will be slippage in the fluid means 207 as cable is being wrapped on drum 187. However, the power, which is transmitted through the torque converter 207, is insufficient to permit the drum 187 to function as a source of driving power for the load on cable 185 and only sufficient strain is provided to take up slack cable.

An advantage which thus occurs is that I provide a driven traction sheave 186 with a groove of a size to interfit the cable and thus provide for maximum surface contact between the cable and its traction means instead of providing surface contact with the cable and other laps of cable therebelow tending to strain and tear and damage the cable and provide minimum tractional surface.

Referring to the side of the mechanism which is furtherest removed from the observer in Fig. 16 of the drawings, there is shown a drum 188, which is mounted on the same shaft as drum 187. The drum 188 is selectively connectible with the same source of power as drum 187 by means of a clutch 217, which is operable by air jam means 218. The air jams 218 and 216 are operable so that the drums 188 and 187 may be connected to the same source of power. Normally only one of the air jams will be operated at one time but they both may be operated for short periods of time to remove slack from the cables. The drum 188 has a brake means 219 carried thereby and thus if air jam means 218 is in a position so that cable is being paid out from drum 188 then the brake 219 may be operated to a degree to keep the cable tight on the drum 188. Also if cable is being paid out from drum 187 and delivered onto drum 188 then the air jam means 216 may be so operated as to free the drum 187 from the source of power and the brake 215 carried by the drum 187 will function as a drag to maintain sufficient tension in the cable as it is being paid off of the drum 187. The cable being paid out from or being delivered to drum 188 passed over and is guided by a guide sheave 220 to driven sheave 192. Guide sheave 220 functions in the same manner as respects its driven sheave 192 as the guide sheave 193 functions in connection with its driven sheave 186. After the cable 189 passes over guide sheaves 220, the same is angularly directed toward and about the driven sheave 192 for almost a complete turn and again air space is provided as described in connection with cable 185, guide sheave 193, driven sheave 186, and suitable lead in means, as sheave 190. Thereafter the cables 185 and 189 are delivered to the desired place of operation and preferably connected together so that one serves as a haul back cable and one serves as a haul in cable.

Connected to the power driven shaft 199 are suitable driving means for the driven sheave 192 and as the same function in all respects similar to the driving means for the sheave 186 I have provided similar numbers for similar parts.

In view of the fact that the power on the haul in line and haul back line is provided by driven sheaves of always the same diameter and having the same peripheral speeds although in opposite directions, I am able to provide interlocked haul in or haul back lines and at the same time without dragging friction devices. Stating the matter in other words, I am able to drive two driven sheaves 186 and 192 in opposite directions and at the same peripheral speed because I employ less than one wrap of cable about such driven sheaves. Thus whenever my device is used in connection with skidders, I can first remove the slack in the line and then as I drive one sheave in one direction and one sheave in the other direction, the positive interlocking of the sheaves may be provided and causes no difficulty as my construction in no way involves the use of driving through drums on which cables are building up or paying out and thus have unequal peripheral speeds. Also, while I have shown brakes 215 and 219 which will function as a drag as cable is being paid out, still such is not a matter of great concern as the drag employed is only sufficient to handle slack in the line and thus the only drag which I do employ is a drag relating to rotary power of no great moment and thus the life of the braking devices 215 and 219 is not a matter of practical concern.

Preferably brakes 221 and 222 are employed in connection with driven sheaves 192 and 186 respectively. These brakes will not be employed as was heretofore common practice in dragging one brake and pulling against the same and they will be employed as holding brakes. In other words supposing it is desirable to tighten the cable 189 after it has left driven sheave 192, then the brake 221 may be applied and the strain exercised by tightening cable 185 to remove slack will be against brake 221 and will not be transmitted through the various laps of the cable which are wound about a drum 188. Obviously the brake 222 may be operated in a similar manner and also both of the brakes 221 and 222 may be set whenever the same is desired and inoperative periods are desired. Also under such later circumstances where a rest period is desired and both brakes 221 and 222 are applied then any tension on the cables 189 and 185 will be carried by such brakes and not carried through the drums 188 and 187 and through wraps of cable which may be around said drums.

In Figs. 15 and 16, I have shown driven sheaves as driven sheaves 186 and a guide sheave such as 193 so that a cable is reeved about a driven sheave for less than a complete turn and the portions of the cable entering and leaving the driven sheave pass in the air and there is no engagement between such portions. While this form of my invention is somewhat simplified as to the arrangement of the traction cable, the traction sheaves, and the guide sheave over that shown in Figs. 2 to 4 inclusive hereof and as shown in my copending application, yet all of the various forms so shown or described may be employed as they all will provide for tractional engagement between a traction cable and a driven sheave and with less than a complete wrap of the cable about the traction sheave.

Referring to Figs. 17 to 22 inclusive, I have illustrated means so that logs may be bundled in the woods, handled by my method of transportation as a bundle, and the bundle then maintained until the logs reach their final delivery point such as a mill. It is believed that the disclosure of Figs. 17 to 22 inclusive is here applicable as showing a means for carrying out my method of handling logs.

In Figs. 17 to 20 inclusive, I show a cable clamping member comprising a frame member 223 of inverted U shape having a curved end portion 224, shown at the top, against which a cable 225, that extends through the said frame, is adapted to be clamped. A cable clamping block 226 is positioned between two sides of the frame members 223 in opposed relation to the curved end portion 224 for the purpose of clamping the cable 225. The length of the cable clamping block 226 is less than the width of the frame member 223 to provide for endwise movement of the clamping block 226 in the frame member 223. The curved end portion 224 is preferably inclined and the clamping block 226 is tapered so that when the clamping block 226 is moved to the left from the position shown in Fig. 17, it will tend to clamp the cable 225 and when the block is moved to the right from the position shown in Fig. 17, it will tend to release said cable 225. Preferably the cable engaging edge portion of the cable clamping block 226 is grooved to fit partially around the cable 225 and is provided with a plurality of shallow ribs 227, Fig. 19, that fit into the groove in the twisted wire cable 225.

The cable clamping block 226 has a compression spring 228 at each end thereof. The two springs 228 bear against side plates 229 that are rigid with the frame member 223. A block 230 is movably disposed within frame member 223 between the side plates 229. Preferably a plate 231 is provided in the top portion of the block 230 to serve as a bearing for the clamping block 226. Shoulders 235 on the side plates 229 limit the downward movement of the block 230.

A wedge member 232 extends through slots 233 in frame members 223 and through a slot 234 in the block 230.

When the wedge 232 is retracted, as shown in Figs. 17 and 18, the clamping block 226 will be in a release position as respects the cable 225, and the cable 225 can be drawn freely and easily in either direction through the clamp. When the wedge 232 is moved to the left from the position shown in Fig. 18, the block 226 will be moved into engagement with the cable 225. When the clamping block 226 is thus moved into firm engagement with the cable 225 by wedge member 232, then said clamping block 226 will firmly bind and hold the cable against any force tending to pull the cable to the left, Fig. 17. However, if the force is exerted tending to pull the cable to the right, Fig. 17, then the right hand spring 228 will yield and the clamping block 226 will be moved to the right far enough to relieve its pressure on the cable. This allows the cable 225 to move through the clamp to the right, Fig. 17, easily, and without undesirable wear but locks it against movement to the left. When the wedge member 232 is in release position, the two springs 228 will move the clamping block 226 to a mid position and release the cable, as shown in Fig. 17. The cable is of a length in excess of the length required to go around the largest bundle of logs to be handled and this cable passes through the clamp member and has an eye 236 (Fig. 20), or equivalent device, on each end.

In bundling logs two or more of the cables 225 are passed around each bundle of logs 237 as shown in Fig. 20, and an eye member 236 on an end portion of each cable is engaged with the hook 238 that is connected with the clamp means. Care is taken to apply each cable 225 to the logs with the cable clamp position so that the cable will run through the clamp and tighten around said logs when a pull is exerted on the end of the cable that extends away from the cable clamp. When thus applied to the logs, the cable 225 can be easily loosened on the logs by retracting the wedge 232. After the logs have been laid down, the cable 225 will always remain tight on the logs until the clamp is released by moving the wedge 232 into a release position.

The bundle of logs provided as shown in Fig. 20 of the drawings, is provided with the cable 225 about one or more portions of the bundle of logs. Preferably at least two cables in longitudinal spaced relation on the logs is employed. The eyes 236 which are shown at the free end of the cable in Fig. 20 are connected with cables, as 144 and 146 shown in Figs. 1 to 4 inc., 13 and 14 of the drawings.

The provision of a movable support for block 230 for the tapered clamping block 226 is an important feature as it makes possible, first, the retraction of the clamping block 226 to allow the cable to run freely in both directions; second, the application of the clamping block 226 to the cable so it will hold the cable against movement through the clamp in one direction and allow it to move through the clamp in the other direction; and third, the easy manual release of the clamping block when it is tightly clamped on the cable and the cable is under tension.

Obviously, the hook means 238 of the various figures which cooperate with the eye means 236 may be replaced by other known equipment, such as an eye means in place of the hook member 238 and hook means in place of the eye members 236; and also ferrule hooks, thimble connectors etc. may be utilized.

The cable clamp shown in Figs. 21 and 22 is similar to the one shown in Figs. 17, 18 and 19 except that a floating roller bearing 239 is used to support the clamping block 226 and a cam 240 is used to move the roller bearing 239 toward and away from the clamping block 226. Fixed block 241, secured by bolts 242 between the side plates 223 of Figs. 21 and 22, functions similarly to the plates 229 of Figs. 17 and 18 and cooperates in supporting the clamping block 226 and roller bearing 239. The cam 240 is moved by levers 243 positioned externally of the frame member 223.

Thus the structure of Figs. 17 to 19 inc. and Figs. 21 to 22 makes it both possible and practical to handle small timber by making the logs up into bundles as shown in Fig. 20 at the location where they are first brought together in the woods and thereafter keeping these bundles intact and handling the bundles, instead of handling the individual logs, through all the stages of transportation up to the mill or manufacturing plant at which the process of sawing or working up the logs is commenced.

From the foregoing it will appear that I have provided an aerial device for the transportation of heavy materials as logs wherein I employ a stationary supporting cableway 100. The sheaves 105 are mounted for traveling movement on said cableway 100 and said cableway 100 may employ a plurality of separate cables. Preferably I employ two cables in side by side relation to form the cableway 100. The main frame means 106 of my vehicle is suspendedly supported from the sheave means 105 and preferably four sheave means 105 are employed. A power unit, so that my vehicle is self-propelled, is mounted on the frame means and by adjustment of the length of the yoke supporting the frame means I may provide desired inclination to the frame member 106 and the power unit supported thereby so that the power unit may operate at any desired angular relation despite the fact that an adverse angle or too great an angle may be involved in the supporting cableway 100. Next, I provide two spaced driven traction sheaves which are on each side of the center of the frame means and said driven traction sheaves are connected with a power unit. Next, I provide spaced guide sheaves 118 which cooperate with the spaced driven traction sheaves 117 to properly lead the traction cables 104 about the driven traction sheaves for almost a complete turn. Thus I obtain maximum traction between the driven sheaves and the traction cable with minimum wear on the cable. Also it is apparent that the engagement with the traction cable below the supporting cableway and the positioning of the driven sheaves and guide sheaves provide for lateral stability of the vehicle.

Next, by providing the guide sheaves 118 angularly and above the driven sheaves 117, the driven sheaves may be employed as traction means for a traction cable or the same driven sheave 117 may support or may be converted into road contacting driven wheels, tractor beds or the like.

By providing hoisting drums 134 and 135 which are separately operable from the propelling means for the vehicle it is possible to move the vertical position of a log which is being supported by my aerial tramway system. One advantage of being able to separately operate the drums 134 and 135 from the propelling means for the vehicle is that when the vehicle is traveling downhill with a load of logs it may be desirable to drag the load on the ground to function as an auxiliary brake or a safety device. Furthermore, there may be terrain conditions such that if the logs are moved to a height to clear all obstacles on the ground, then the logs may be at an extremely high level at the unloading point. Therefore, it is highly desirable to be able to move the load of logs up or down as the vehicle travels without interfering with the traveling of the vehicle so that when the vehicle reaches the unloading platform then the logs are substantially in position to be unloaded and therefore utmost efficiency in operation obtains.

Also, in view of my apparatus and method herein disclosed it is possible to handle small logs which were heretofore left in the woods as it was not possible to handle the same because the cost of the logging was greater than the value of the logs. With my invention it is possible to bundle the logs in the woods and as they are thereafter handled as a bundle completely to the mill, the logs can be economically and practically handled within the cost of logging operations. Thus many logs which are now left in the woods and are waste can be salvaged and are now pay loads due to my invention.

Another advantage which obtains by my invention is that I may employ a plurality of cables in the supporting cableway and employ some of the cables to handle my vehicle and part of the weight of the logs and employ other cables which solely support the load and thereby the strains and stresses which are developed by the handling of heavy materials are transferred directly to the cableway and only a portion of such strains and stresses are transferred to the cableway through my vehicle.

In view of the intermediate supporting means 101 which I have shown in my invention it is possible to provide a cableway of indefinite length. With the traveling cables of the prior art, the power necessary to provide the traveling movement of the cables was such that it has been heretofore considered that approximately 2000 feet is the maximum extent of the cableway as any greater length requires so much power to merely move the cable itself that it was not possible to provide the desired length. With my invention due to the fact that the cableway 100 employs stationary cables and in view of the fact that my traction cables 104 are likewise stationary and in view of the intermediate supports 101 in the cableway 100 through which my vehicle may pass, my cableway system may be employed for indefinite length of cableway and not merely as a side feeder requiring other means of transportation where long lengths of travel were involved.

Obviously, changes may be made in the forms, dimensions, and arrangement of the parts of my invention, without departing from the principle thereof, the above setting forth only preferred forms of embodiment or illustrating mechanisms whereby my method may be employed.

I claim:

1. In an aerial device for transporting heavy materials, a stationary supporting cableway; supporting sheave means mounted for movement on said supporting cableway; frame means suspendedly supported from said sheave means; a power unit carried by said frame means; two spaced driven traction sheaves positioned on each side of said frame means and connected with said power unit; spaced guide sheave means positioned on each side of said frame means above said traction sheaves; and two spaced stationary traction cables, each reeved over a guide sheave, thence downwardly and about a driven sheave for less than a complete turn, thence toward and over and about the second driven sheave for less than a complete turn, and thence upwardly and over a guide sheave, whereby maximum traction engagement between the driven sheaves and the traction cable obtains with minimum wear on the cable and the traction cable provides lateral stability to the device.

2. In an aerial device for transporting heavy materials, a stationary supporting cableway; supporting sheave means mounted for movement on said supporting cableway; frame means suspendedly supported from said sheave means; a power unit carried by said frame means; two spaced driven traction sheaves positioned on each side of said frame means and connected with said power unit; angularly positioned spaced guide sheave means located on each side of said frame means above said traction sheaves and directing a cable angularly toward and away from said traction sheaves and toward the centers thereof; and two spaced stationary traction cables, each reeved over a guide sheave, thence downwardly, angularly and toward and about a driven sheave for less than a complete turn, thence directly toward and over and about the second driven sheave for less than a complete turn, and thence upwardly, angularly and toward and over a guide sheave, whereby maximum traction engagement between the driven sheaves and the traction cable obtains with minimum wear on the cable and the traction cable provides lateral stability to the device.

3. In an aerial device for transporting heavy materials, a stationary cableway; supporting sheave means mounted for movement on said supporting cableway; frame means suspendedly supported from said sheave means; a power unit carried by said frame means; a driven traction sheave carried by said frame means and connected with said power unit; an angularly positioned guide sheave directing a cable angularly toward the plane of said traction sheave; and a traction cable reeved first about said guide sheave, then angularly toward and about said driven sheave for less than a complete turn, and then directly away from said driven sheave continuing in the same general direction of its approach to said guide sheave, said sheave being relatively positioned so that said cable is reeved about said driven sheave for less than a complete turn and the cable portions entering and leaving the driven sheave are in spaced relation due to the angular position of the guide sheave without lateral movement of the cable in the sheaves.

4. In an aerial device for transporting heavy materials, a stationary supporting cableway comprising a plurality of spaced cables; a plurality of supporting sheave means mounted for traveling movement on the cables of said cableway; yoke means interconnecting said sheave means; frame means suspendedly supported from said yoke means; a power unit carried by said frame means; traction sheave means on opposite sides of said frame means connected with said power unit; a traction cable reeved about said traction sheave means on each side of said frame means and disposed to hang from said device to tension the cable on said traction sheave means and to stabilize said device against sidesway; and a cable means for suspendingly supporting a load and connected with said frame means.

5. In an aerial device for transporting heavy materials, a stationary supporting cableway; sheave means mounted for traveling movement on said cableway; frame means suspendedly supported from said sheave means; a power unit carried by said frame means; traction sheave means connected with said power unit and arranged to support a cable reeved thereabout with all bends continuing in the same angular direction and having a minimum diameter of about thirty times the diameter of the cable employed; a traction sheave cable reeved about said traction means; and a cable means for suspendingly supporting a load and connected with said frame means.

6. In an aerial device for transporting heavy materials, a stationary supporting cableway; supporting sheave means mounted for traveling movement on said cableway; frame means suspendedly supported from said sheave means; a power unit carried by said frame means; traction sheave means connected with said power unit; and a traction cable reeved about said traction sheave means and disposed to hang from said device to tension the cable and stabilize the device.

7. In a device as defined in claim 6, hoisting means carried by said frame means, additional supporting sheave means mounted for traveling movement on said cableway, and a load carrying cable connected with said hoisting means and supported at least in part by said additional sheave means.

8. In an aerial device for transporting heavy materials, a stationary supporting cableway comprising a plurality of spaced cables; supporting sheave means mounted for traveling movement on some of the cables of said cableway; frame means suspendedly supported from said sheave means; a power unit carried by said frame means; traction sheave means connected with said power unit; a traction cable reeved about said traction sheave means; a separately operable hoisting means carried by said frame means; load supporting sheave means mounted for traveling movement on other of the cables of said cableway; and a cable means suspendingly supporting a load and reeved about said load supporting sheave means and connected with said hoisting means, whereby the load is carried by all of the cables of said cableway means and the vehicle by some thereof and an operator on said vehicle can periodically adjust the vertical position of the load as ground terrain conditions require and prevent engagement of the load with obstacles tending to cause damage.

9. In an aerial device for transporting heavy materials, a stationary supporting cableway with passable supports intermediate its length; supporting sheave means mounted for traveling movement on said cableway for substantially the complete length thereof; frame means suspendedly supported from said sheave means; a power unit carried by said frame means; traction sheave unit connected with said power unit; a traction cable reeved about said traction sheave means and disposed to hang from said device to tension the cable on said traction sheave means and to stabilize said device against sidesway; and a cable means for suspendingly supporting a load and connected with said frame means.

10. In a device of the class described, a frame means; a power unit carried by said frame means; a differential means connected with said power unit; two spaced driven traction wheels positioned on each side of said frame means and having the wheels on the same side connected with the same side of the differential means, whereby a mobile ground vehicle having tractor-like steering means is provided; traction sheave means carried by said driven traction wheels; guide sheaves positioned on each side of the frame means and above said traction sheave means; and two spaced traction cables, each reevable over a guide sheave, thence downwardly and about a driven sheave for less than a complete turn, thence toward and over and about the second driven sheave for less than a complete turn, and thence upwardly and over a guide sheave, whereby upon the removing from the ground of any two traction wheels, the traction sheave means carried by such wheels will cooperate with the traction cable reeved thereover to provide relative motion therebetween.

11. In a device of the class described, a driven traction sheave, a traveling cable reeved on said sheave; guide sheave means guiding said cable for less than a complete wrap about said traction sheave; a cable take-up drum connected with said cable and taking up cable moved by said traction sheave; and yieldable power transmission means connecting said drum to a source of power, whereby the traction to drive said cable is transmitted by said driven sheave and the drum takes up cable with yieldable power and prevents damage to the cable by forceful contact of portions as the cable builds up on the drum.

12. In a vehicle propelled by tractive effort exerted upon a stationary traction cable, a pair of driven traction sheaves rotatable in a common vertical plane, each of said traction sheaves having a groove adapted to center a traction cable in said plane, and a pair of guide sheaves inclined to said plane to lead said traction cable toward and from the centers of said grooves and positioned to produce a wrap on said traction sheaves intermediate between 180° and 360° in the centers of said grooves with inclined reaches of said cable passing in spaced relation to portions of said cable in said plane, there being one reach of said cable disposed entirely in said plane and extending between said traction sheaves, and there being two of said inclined reaches, one extending between one of said traction sheaves and one of said guide sheaves and the other extending between the other of said traction sheaves and the other of said guide sheaves.

13. In a vehicle adapted to propel itself by tractive effort exerted upon a stationary traction cable, a pair of driven traction sheaves rotatable in a common vertical plane, a first guide sheave positioned in advance of said traction sheaves and inclined to receive a traction cable at one side of said vertical plane and deliver it at an angle to one of said traction sheaves, and a second guide sheave positioned to the rear of said traction sheaves and inclined to receive a traction cable from said traction sheaves at an angle and deliver it at one side of said plane in substantial alignment with the cable received by said first guide sheave, the inclination of said guide sheaves being sufficient to cause portions of said cable to pass each other without rubbing, and said guide sheaves positioned to wrap said cable between 270 degrees and 360 degrees on each of said traction sheaves with an intermediate reach of the cable extending between the two traction sheaves.

14. In a vehicle adapted to propel itself by tractive effort exerted upon a stationary traction cable, a pair of driven traction sheaves rotatable in a common vertical plane and adapted to center a cable thereon in said plane, and a pair of inclined guide sheaves to lead a traction cable into and out of said plane on said traction sheaves without rubbing against portions of the cable centered in said plane, said guide sheaves being spaced to produce a cable wrap on said traction sheaves greater than 180° and less than 360°, and said sheaves being positioned to conduct an intermediate reach of the cable in said plane between the two traction sheaves and to conduct inclined end reaches of the cable between said traction sheaves and the respective guide sheaves.

15. In a vehicle adapted to exert a tractive effort upon a stationary traction cable to move itself therealong, a pair of driven traction sheaves rotatable in a common vertical plane and adapted to center a cable thereon in said plane, and a pair of guide sheaves arranged to lead a traction cable into and out of said plane for a wrap of between 180° and 360° in said plane on said traction sheaves without rubbing contact between different portions of the cable, said cable between said traction sheaves and the respective guide sheaves being inclined to said plane and said cable between said traction sheaves being disposed in said plane.

16. A cable track vehicle comprising supporting sheaves adapted for movement on a dual-cable track, means for suspending a vehicle frame from said supporting sheaves, traction sheaves adapted to engage a stationary traction cable to move said vehicle on said cable track, said suspending means comprising a transverse yoke member intermediately pivotally connected with the vehicle and hangers for said supporting sheaves independently pivotally connected with said yoke member to carry said vehicle in its normal position for travel on a single-cable track in the event of failure of support of one of the cable tracks, said hangers connected with said yoke at points having a lateral spacing equal to the spacing of the cables of the dual-cable track.

17. A cable track vehicle comprising a vehicle frame, traction sheaves on said frame adapted to engage a stationary traction cable to propel said vehicle, supporting sheaves for said vehicle adapted to ride on a dual-cable track, and means for suspending said vehicle frame normally from said supporting sheaves on said dual-cable track and operative to suspend said frame in normal position for travel on one of said track cables in the event of failure of support of the other track cable, said suspending means comprising a transverse yoke member at each end of the vehicle frame, supporting sheave hangers independently pivotally connected with each yoke at points having a lateral spacing equal to the spacing of said dual cables, and a pivotal connection between a mid-point of each yoke and said vehicle frame.

18. A cable track aerial vehicle system comprising a stationary cable track, means for supporting said cable track at intervals above the ground, a stationary traction cable disposed loosely along the route of said cable track, a vehicle having supporting sheaves to suspend the vehicle for travel on said cable track, and traction sheaves on the vehicle to engage said traction cable to propel the vehicle on said cable track, said traction sheaves being mounted under the vehicle to support and drive the vehicle on the ground.

19. An aerial vehicle system comprising an elevated stationary cable track, a vehicle on said track, a pair of non-tensioned, stationary traction cables, and traction sheaves on said vehicle arranged to engage said traction cables to propel the vehicle on said cable track, said traction sheaves projecting under the vehicle to support the vehicle on the ground.

20. In an aerial vehicle system having a stationary cable track and stationary traction cables, a vehicle adapted to travel on said cable track above the ground and on the ground without said cables, and traction sheaves on said vehicle to engage said traction cables to propel said vehicle on said cable track, said traction sheaves projecting beneath the vehicle to support and drive said vehicle on the ground.

21. A combination vehicle adapted to travel either on a road surface or on an aerial cable track comprising supporting sheave means for suspending said vehicle from a cable track, driven traction sheave means on opposite sides of the vehicle adapted to engage stationary traction cables to drive said vehicle on said cable track and adapted to transmit a tractive effort to a road surface to drive said vehicle on the road, and a differential between said traction sheave means to equalize the pull on said traction cables when running on the cable track and to permit steering of the vehicle on the road.

22. In a vehicle, supporting sheaves above the vehicle for suspending the vehicle from an elevated cable track, an engine, traction sheaves on opposite sides of the vehicle driven by said engine, and grooves in said sheaves to engage stationary traction cables for propelling the vehicle on said cable track, said sheaves projecting under the vehicle to support the vehicle on the ground.

23. In a cable track vehicle, supporting sheaves for supending the vehicle from a cable track, traction sheaves projecting under the vehicle and on opposite sides thereof to support the vehicle on the ground, and means to guide a pair of traction cables, one on each side of the vehicle, around said sheaves for almost a complete wrap with different reaches of the cable passing each other adjacent the sheaves without rubbing and with all bends of the cables being in the same direction, to propel the vehicle on the cable track.

24. A power driven traction sheave having a cable groove, means to tension a reach of cable leaving said sheave in the plane of the center of said groove, and an inclined guide sheave arranged to lead another reach of said cable into the center of said groove at an angle to the plane of the groove to pass said first reach without rubbing, with the cable having a wrap of between 270 degrees and 360 degrees on said traction sheave.

25. A traction sheave having a cable groove, a cable disposed in said groove for almost a complete wrap around said sheave, power operated means driving said sheave to pull in one reach of said cable on one side of said sheave and pay out another reach of said cable on another side of said sheave, power operated means for tensioning said last reach to maintain traction between said sheave and the cable, and an inclined guide sheave arranged to lead one of said reaches at an angle to the plane of the traction sheave to pass the other reach without rubbing, all bends in said cable being in the same direction.

26. In a vehicle propelled by tractive effort exerted upon a stationary traction cable, a traction sheave, a guide sheave arranged to lead a cable into the center of the groove of said traction sheave at an angle to the plane of the traction sheave, a second traction sheave arranged to receive said cable from said first traction sheave, and a second guide sheave arranged to receive said cable from said second traction sheave at an angle to the plane of the traction sheave, said cable having a wrap of between 270 degrees and 360 degrees in the center of the groove of each traction sheave.

27. In a vehicle propelled by tractive effort exerted upon a stationary traction cable, a pair of traction sheaves, and a pair of guide sheaves arranged to lead a cable toward and away from said traction sheaves with a wrap of from 270 degrees to 360 degrees on each traction sheave and with the cable disposed in the center of the groove in each sheave throughout its contact with the sheave.

28. In a vehicle propelled by tractive effort exerted upon a stationary traction cable, a pair of traction sheaves, and a pair of guide sheaves arranged to lead a cable toward and away from said traction sheaves with a wrap of from 270 degrees to 360 degrees on each traction sheave, and with the cable bending in the same direction around all the sheaves and centered in the groove of each sheave throughout its contact with the sheave.

PHILIP GRABINSKI.

REFERENCES CITED

The following references are of record in the file of this patent:

UNITED STATES PATENTS

| Number | Name | Date |
| --- | --- | --- |
| 445,088 | Sell et al. | Jan. 20, 1891 |
| 674,870 | Mitchel | May 28, 1901 |
| 830,491 | Bozzalla | Sept. 11, 1906 |
| 1,075,600 | Nelson | Oct. 14, 1913 |
| 1,110,307 | Williams-Foote | Sept. 8, 1914 |
| 1,155,760 | Sauvola | Oct. 5, 1915 |
| 1,222,007 | McGuire | Apr. 10, 1917 |
| 1,485,653 | Walters | May 4, 1924 |
| 1,642,568 | Tyler | Sept. 13, 1927 |
| 1,714,183 | McPhee | May 21, 1929 |
| 1,801,527 | Newell | Apr. 21, 1931 |
| 2,019,760 | Mattro | Nov. 5, 1935 |
| 2,234,602 | McIntosh | Mar. 11, 1941 |
| 2,349,263 | Grabinski | May 23, 1944 |

FOREIGN PATENTS

| Number | Country | Date |
| --- | --- | --- |
| 193,566 | Germany | Dec. 23, 1907 |